(12) United States Patent
Honey et al.

(10) Patent No.: US 10,426,091 B2
(45) Date of Patent: Oct. 1, 2019

(54) PICKUP REEL FOR A CROP HARVESTING HEADER

(71) Applicant: HONEY BEE MANUFACTURING LTD., Frontier (CA)

(72) Inventors: Glenn Raymond Honey, Bracken (CA); Lee Glenn Harper, Shaunavon (CA)

(73) Assignee: HONEY BEE MANUFACTURING LTD., Frontier, Saskatchewan (CA)

( * ) Notice: Subject to any disclaimer, the term of this patent is extended or adjusted under 35 U.S.C. 154(b) by 0 days.

(21) Appl. No.: 16/196,371

(22) Filed: Nov. 20, 2018

(65) Prior Publication Data

US 2019/0082601 A1    Mar. 21, 2019

(51) Int. Cl.
*A01D 57/04*    (2006.01)
*A01D 57/12*    (2006.01)
*A01D 57/03*    (2006.01)

(52) U.S. Cl.
CPC ............. *A01D 57/04* (2013.01); *A01D 57/03* (2013.01); *A01D 57/12* (2013.01)

(58) Field of Classification Search
CPC ........ A01D 34/04; A01D 57/02; A01D 57/03; A01D 57/04; A01D 57/12; A01D 45/00; A01D 61/002
USPC ...... 56/14.4, 220, 224, 226, 327.1, 364, 227
See application file for complete search history.

(56) References Cited

U.S. PATENT DOCUMENTS

| | | | |
|---|---|---|---|
| 3,263,512 A | 8/1966 | Handley | |
| 5,987,861 A * | 11/1999 | Duncan | A01D 57/03 460/142 |
| 6,591,598 B2 | 7/2003 | Remillard et al. | |
| 6,698,175 B1 * | 3/2004 | Schumacher | A01D 57/03 56/14.4 |
| 7,665,287 B2 * | 2/2010 | Jones | A01D 57/02 56/364 |
| 9,820,440 B2 * | 11/2017 | Jost | A01D 57/03 |
| 2008/0022647 A1 * | 1/2008 | Jones | A01D 57/02 56/220 |
| 2015/0313081 A1 | 11/2015 | Jost et al. | |
| 2017/0055451 A1 | 3/2017 | Jasper | |
| 2017/0059027 A1 * | 3/2017 | Jasper | A01D 57/03 |

* cited by examiner

*Primary Examiner* — Robert E Pezzuto

(57) ABSTRACT

A crop harvesting header including a pickup reel mounted for rotation about a reel axis includes a plurality of reel bats peripherally disposed and having outwardly extending fingers rotatable about a bat axis. A cam track surrounding the reel axis includes a cam surface and a guide surface. A linkage associated with each reel bat has first and second cam followers that engage the cam surface at first and second contact points displacing the linkage while traversing the cam track, the linkage being coupled to cause rotation of the reel bat about the bat axis for changing an angle of attack of the fingers. A guide follower engages the guide surface at a third contact point between the first and second contact points and is offset to cause the first and second cam followers and the guide follower to maintain contact with the guide surface while traversing the cam track.

16 Claims, 6 Drawing Sheets

FIG. 5A  FIG. 5B

PICKUP REEL FOR A CROP HARVESTING HEADER

BACKGROUND

1. Field

This disclosure relates generally to agricultural equipment and more particularly to a pickup reel for use in a crop harvesting header.

2. Description of Related Art

Crop harvesting headers are used in agriculture for a variety of purposes. For example, a header may be carried in front of a propulsion unit that moves through a crop field while cutting, gathering, and/or processing the crop. The header typically includes a cutter bar oriented transverse to a direction of motion of the propulsion unit and a pickup reel including a plurality of fingers extending outward from a periphery of the reel to engage the crop being harvested. The pickup reel and fingers are rotated within the header to move the crop through the header toward the cutter bar. The fingers on the pickup reel are generally mounted on a plurality of rotatable tubes known as "bats" that cause an attack angle of the fingers to be varied while rotating to cause a raking or sweeping action for gathering and moving the crop through the header.

SUMMARY

In accordance with one disclosed aspect there is provided a crop harvesting header apparatus including a pickup reel mounted for rotation about a reel axis within the header. The apparatus also includes a plurality of reel bats peripherally disposed on the pickup reel about a reel axis, each reel bat having a plurality of outwardly extending fingers along a length of the reel bat, each reel bat being rotatable about a bat axis. The apparatus further includes a non-circular cam track mounted adjacent to the pickup reel and surrounding the reel axis, the cam track being immobilized with respect to the header. The cam track includes a cam surface and a guide surface. The apparatus also includes a linkage associated with each reel bat and having first and second spaced apart cam followers disposed to engage the cam surface at first and second points of contact, the cam surface being configured to cause displacement of the linkage in a generally radial direction with respect to the reel axis while traversing the cam track during rotation of the pickup reel. The linkage is coupled to the reel bat such that the displacement of the linkage causes rotation of the reel bat about the bat axis for changing an angle of attack of the fingers to control movement of a crop through the header. The apparatus further includes a guide follower disposed on the linkage for engagement of the guide surface at a third point of contact between the first and second points of contact. An offset between the guide surface and the cam surface along the cam track is selected to cause each of the first and second cam followers to maintain contact with the cam surface and the guide follower to maintain contact with the guide surface while traversing the cam track.

The offset distance between the guide surface and the cam surface may vary for points of contact along the cam track, the offset distance being selected to cause a generally constant loading force on each of the first and second cam followers and the guide follower while traversing the cam track.

The cam track may include an outwardly oriented surface with respect to the reel axis that acts as the cam surface, and an inwardly oriented surface that acts as the guide surface.

The cam track may include an inwardly oriented surface that acts as the cam surface, and an outwardly oriented surface with respect to the reel axis that acts as the guide surface.

The cam track may include a first cam track that provides the cam surface and a second cam track that provides the guide surface, the first and second cam tracks being mechanically coupled to form the cam track.

The cam track may include a mounting disk, and at least one track attached to the mounting disk via a plurality of posts extending parallel to the reel axis to facilitate unimpeded traversing of the cam track by the first and second cam followers and the guide follower.

The at least one track may include a single track having opposing surfaces that provides both the cam surface and the guide surface.

The at least one track may include at least two track sections mounted end to end on the mounting plate, each track section having opposing surfaces that provide portions of the cam surface and the guide surface.

The first and second cam followers each may each include a roller operably configured to engage the cam surface.

The guide follower may include a roller operably configured to engage the guide surface.

The linkage may include a plate, the first and second cam followers being mounted spaced apart on the plate at a proximal end thereof, the guide follower being mounted on the plate offset from the first and second cam followers, and a distal end of the plate being coupled to the respective reel bat.

Each reel bat may include a crank arm mechanically coupled to the reel bat and the linkage may be coupled to an end of the crank arm for causing rotation of the respective reel bat about the bat axis in response to displacement of the linkage.

The cam track may be rotatably mounted on a shaft aligned with the reel axis to facilitate advancing or retarding the cam with respect to the pickup reel to adjust a timing of the movement of the fingers on each reel bat.

The cam track may include a mounting plate having a plurality of locking locations that selectively immobilize the cam track to provide a desired timing for movement of the fingers.

The mounting plate may include at least one locking location disposed to immobilize the cam track at a location that causes fingers on adjacent reel bats to be substantially retracted for transport of the header when not in operation.

In accordance with another disclosed aspect there is provided a pickup reel apparatus including a first pickup reel and a second pickup reel mounted adjacently within the header, each pickup reel being configured as defined above.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 5A is a rear perspective view of the cam assembly shown in FIG. 3;

FIG. 5B is a front perspective view of the cam assembly shown in FIG. 3;

DETAILED DESCRIPTION

Figure 1:
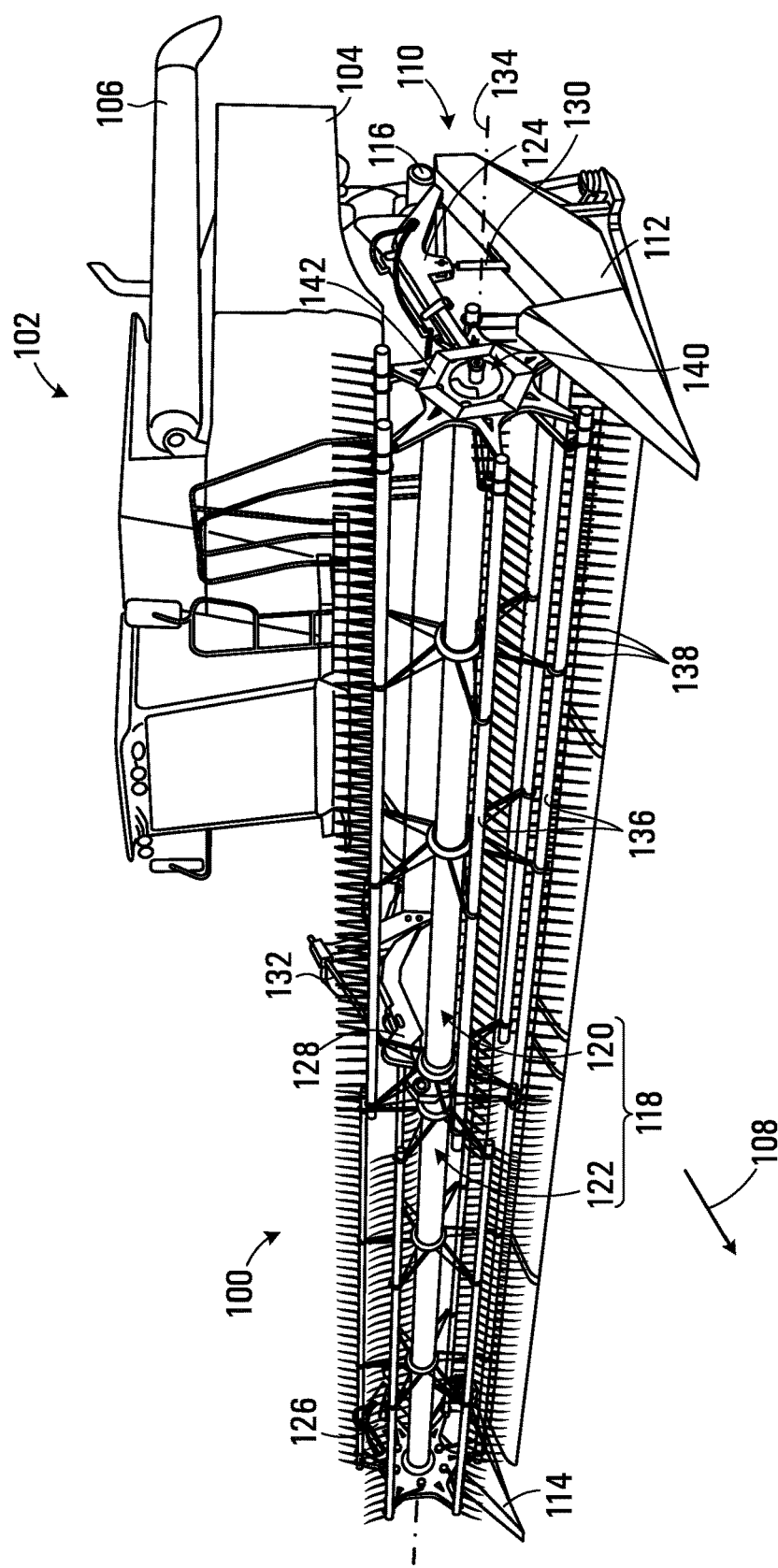
FIG. 1 is a perspective view of a crop harvesting header in accordance with one disclosed embodiment being carried by combine harvester propulsion unit.

Referring to FIG. 1, a crop harvesting header is shown generally at 100. The header is being carried by a propulsion unit 102, which in this embodiment is a combine harvester including a processing portion 104 that performs some processing of the crop being harvested. The propulsion unit 102 also includes a discharge chute 106 for discharging the processed crop into a cargo area of a truck for transport. During harvesting operations, the propulsion unit 102 moves across a field in a direction indicated by the arrow 108 while gathering, cutting, and processing crops growing in the field. The header 100 is generally oriented transverse to the direction of movement 108 and includes a frame 110 having side supports 112 and 114 and a transversely extending structural beam 116 extending between the side supports. The frame 110 includes coupling features (not shown in FIG. 1) that connect the frame of the header 100 to the propulsion unit 102.

In this embodiment the header 100 includes a pickup reel 118 that is split at the center into two separate pickup reels 120 and 122. The header 100 further includes reel arms 124 and 126 at opposite ends of the header and a medial reel arm 128 located substantially at the middle of the header in a transverse direction. The reel arms 124 and 128 mount and support the pickup reel 120 for rotation within the header 100. Similarly, the reel arms 126 and 128 support the pickup reel 122 for rotation within the header 100. The reel arms 124, 126, and 128 also include a plurality of hydraulic cylinders (cylinders 130 and 132 are visible in FIG. 1), which are controlled by a hydraulic system on the propulsion unit 102 to set a pickup reel height within the header 100 for harvesting different crops. The medial reel arm 128 houses a drivetrain (not shown) for delivering a drive torque to the reels 120 and 122 to cause rotation of the reels about a reel axis 134. In other embodiments a single pickup reel may span substantially the entire width of the header 100.

Each of the pickup reels 120 and 122 include a plurality of reel bats 136 peripherally disposed on the reel, each reel bat having a plurality of fingers 138 extending outwardly from the bats that act to engage and sweep the crop through the header 100. The header 100 further includes a cam assembly 140 mounted within the header 100 adjacent to the pickup reel 120. The cam assembly 140 generally causes the plurality of fingers 138 on each of the plurality of bats 136 to undergo a change in angle of attack as the reel is rotated within the header. In FIG. 1 the cam assembly 140 is partially obscured by a side plate 142.

Figure 2:
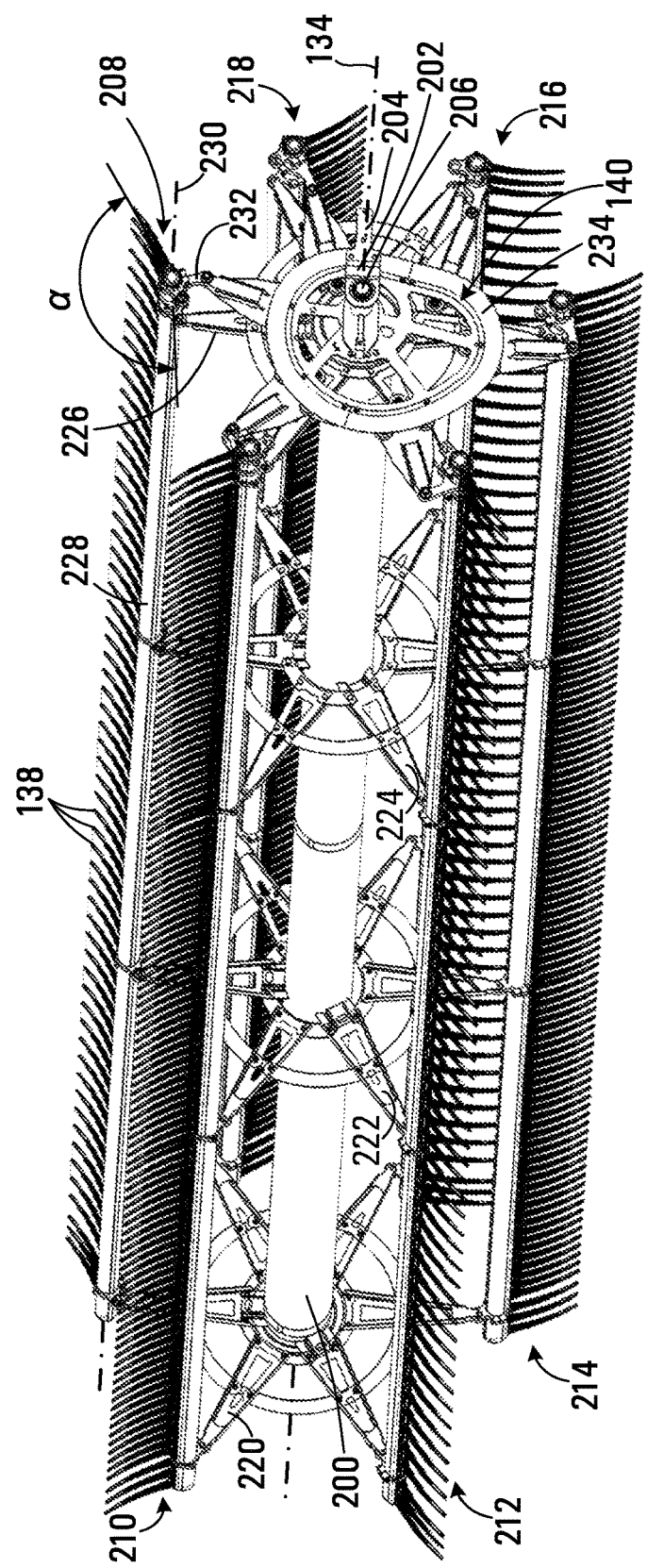
FIG. 2 is a perspective view of a pickup reel of the head shown in FIG. 1.

The pickup reel 120 is shown in FIG. 2 with the side plate 142 removed. The two pickup reels 120 and 122 are similarly configured, except that the reel 122 is mounted with its cam assembly disposed proximate the side support 114 of the frame 110. The pickup reel 120 includes a central reel tube 200 that defines the reel axis 134 for rotation. The pickup reel 120 includes a cantilever mount 202 having a bar 204 that bolts to the reel arm 124 for mounting the reel within the header 100. The cantilever mount 202 accommodates a shaft 206 that aligns with the reel axis and supports the central reel tube 200 for rotation. Further details of the shaft cantilever mount 202 and shaft 206 are described later herein. A similar cantilever mount and shaft (not shown) would support the distal end of the pickup reel 120 for rotation.

In this embodiment the plurality of bats 136 includes six separate bats 208, 210, 212, 214, 216 and 218. Each of the bats 208-218 are mounted on supports 220, 222, 224 and 226, which are attached to the main reel tube 200 and space the bats peripherally with respect to the reel axis 134. Each of the bats 208-218 is similarly configured, and as shown for the bat 208 includes a bat tube 228 that is mounted on the supports 220-226 for rotation about a bat axis 230. In other embodiments the pickup reel 120 may be configured to heave more than six reel bats 136 or fewer than six reel bats.

The plurality of fingers 138 are fixed to the bat tube 228 along a length thereof and are general directed outwardly with respect to the plurality of bats 136 forming an angle α with respect to a radial line drawn outwardly from the reel axis 134. In this disclosure the angle α is referred to as the "angle of attack" of the fingers 138. Each bat 201-218 includes a crank arm 232 disposed at an end of the bat tube 228 proximate the cam assembly 140. The crank arm 232 is mechanically coupled to the bat tube 228, and when rotated about the bat axis 230 causes the bat tube and plurality of fingers 138 to rotate about the bat axis.

Figure 3:
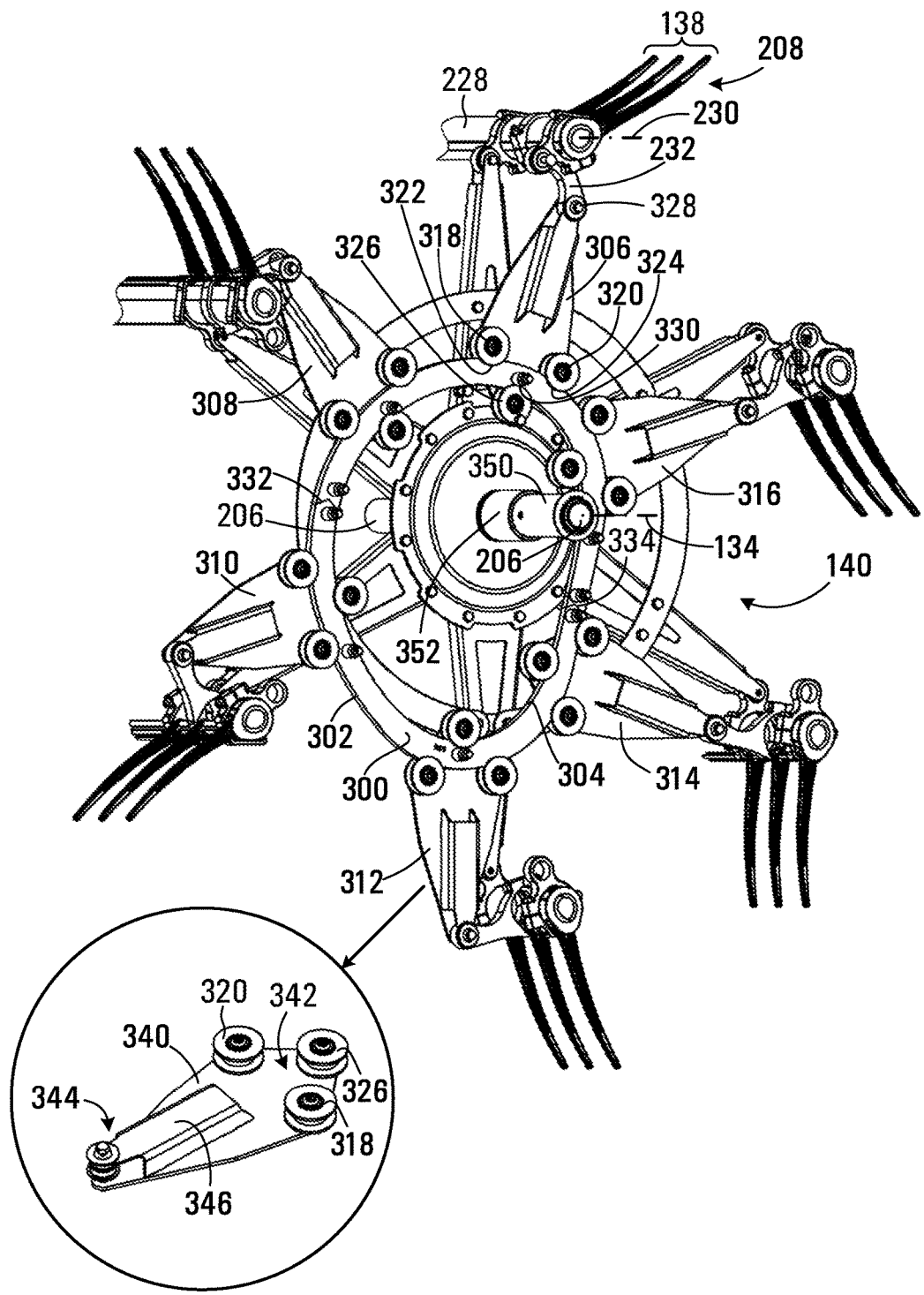
FIG. 3 is a perspective view of a cam assembly of the pickup reel shown in FIG. 2.

The cam assembly 140 has a deflector 234 that protects components of the cam assembly 140 from being jammed by crop wrapping around the pickup reel 120 while harvesting. The cam assembly 140 is shown in FIG. 3 with the cantilever mount 202 and deflector 234 removed to reveal underlying components of the cam assembly 140. The shaft 206 is received within bushings 350 and 352 that facilitate rotation of the shaft within the cantilever mount 202 (not shown in FIG. 3). The cam assembly 140 includes a non-circular cam track 300, which is mounted adjacent to the pickup reel 120. The cam track 300 surrounds the reel axis 134 and is immobilized with respect to the header, as is described later herein. The cam track 300 includes a cam surface 302 and a guide surface 304. In this embodiment the cam surface 302 and the guide surface 304 are disposed on opposite sides of a single cam track 300, but in other embodiments the cam and guide surfaces may be disposed on separated tracks.

Each reel bat 210-218 has an associated linkage 306-316. As an example, the reel bat 208 has a linkage 306 that has first and second spaced apart cam followers 318 and 320 disposed to engage the cam surface 302 at first and second points of contact 322 and 324. In this embodiment the cam followers 318 and 320 are implemented as roller cams operably configured to minimize friction and noise when traversing the cam track and closely coupled to the track. The linkage 308 is coupled to the crank arm 232 of the reel bat 208 at a pivot 328, such that displacement of the linkage causes rotation of the reel bat about the bat axis 230 for changing an angle of attack of the fingers 138 to control movement of a crop through the header 100. The linkage 306 further includes a guide follower 326 that contacts the guide surface 304 at a third point of contact 330. In this embodiment the guide follower 326 is implemented as roller cam.

In this embodiment the linkages 306-316 each include a plate 340, as shown in the insert in FIG. 3. The plate has a proximate end 342 and a distal end 344. The cam followers 318 and 320 are spaced apart at the proximate end 342 of the plate 340. The guide follower 326 is also offset from the cam followers at the proximate end 342 of the plate 340. The pivot 328 is mounted on a bracket 346 at the distal end 344 of the plate 340. The linkages 308-316 are similarly configured.

Figure 4:
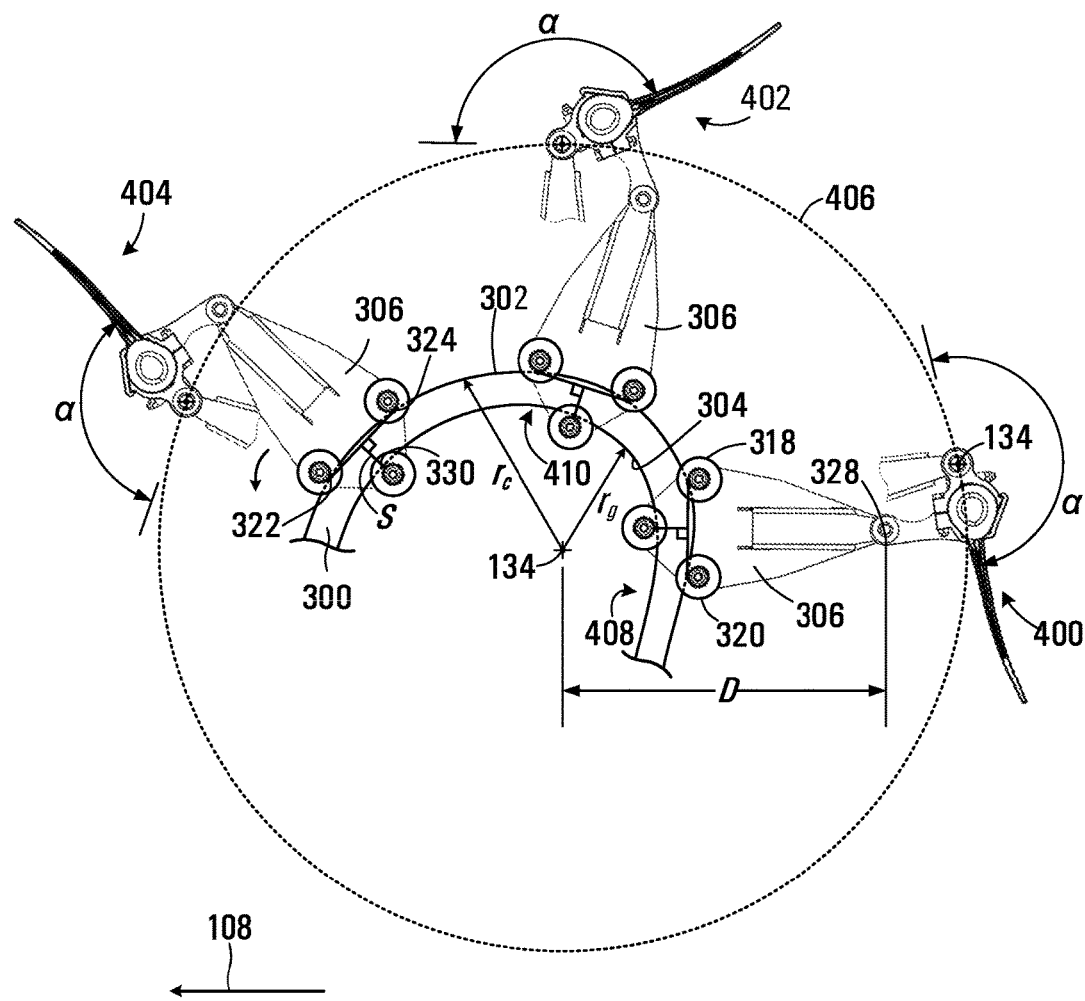
FIG. 4 is a schematic view of a linkage traversing a portion of a cam track of the cam assembly shown in FIG. 4.

Referring to FIG. 4, the linkage 306 is shown in three successive configurations 400, 402, and 404 while traversing a portion of the cam track 300. The bat axis 134 remains on a circular locus indicated by the broken line 406 by virtue of the fixed supports 220-226 that cause the bat tube 228 to rotate about the reel axis 134. The cam surface 302 of the cam track 300 has a profile located at a varying distance $r_c$ from the reel axis 134, where $r_c$ varies as a function of angular displacement about the reel axis. The first and second cam followers 318 and 320 are located at a proximal end of the linkage 306 and have respective roller surfaces that are shown in contact with the cam surface 302 at the respective first and second points of contact 322 and 324. The variation of radius $r_c$ may be established at design time to generate desired angles of attack α for the fingers with rotation of the pickup reel 120.

The variation in $r_c$ at the locations 400-404 on the cam surface 302 causes the displacement D between the reel axis 134 and the pivot 328 on the crank arm 232 to vary as the linkage 306 traverses with the first and second cam followers 318 and 320 in contact with the cam track 300. The profile of the cam surface 302 is thus selected to cause the pivot 328 to extend or retract with respect to the reel axis 134 in a generally radial direction. This movement causes the fingers 138 to be disposed at differing attack angles α depending on the location of the linkage 306 on the cam surface 302. For example, at the location 400, the linkage 306 is retracted to place the fingers 138 at an obtuse attack angle α, where the fingers are largely retracted to be almost parallel to the reel bat locus 406. At the location 402, the linkage 306 has been extended by the cam surface 302 to place the fingers 138 at a less obtuse attack angle α than at location 400, where the fingers are beginning to deploy for engagement of the crop. At the location 404, the linkage 306 has been almost fully extended by the cam surface 302 to place the fingers 138 at an attack angle α that is close to 90°. Further traversal around the cam surface 302 may cause full extension of the linkage 306 causing the fingers 138 to take on an attack angle α that is less than 90°.

For a direction of movement 108 as shown in FIG. 4, the fingers 138 in the location 400 are generally inactive and away from the region of crop engagement. The fingers 138 are beginning to deploy for crop engagement at location 402 and at location 406 are ready to commence crop engagement.

The guide follower 326 is also disposed at a proximal end of the linkage 306, but spaced apart from the first and second cam followers 318 and 320 by a fixed separation s. In FIG. 4, the separation S is shown as a perpendicular distance between a line taken through the first and second points of contact 322 and the third point of contact 330. The separation S should be the same for each of the linkages 306-316, within manufacturing tolerances. An offset between the guide surface 304 and the cam surface 302 (i.e. the difference: $r_c-r_g$) is determined once a profile of the cam surface has been selected to provide desired attack angles α as a function of linkage traversal on the cam surface. The correct offset may be established at design time from a previously established profile of the cam surface 302 and from the geometry of the first and second cam followers 318, 320 [outside cam path] and the guide follower 326 [inside guide path].

As an example, a locus of successive points on the guide surface 304 may be generated from the first and second points of contact 322 and 324 on the basis of the separation S from the first and second cam followers to the required third point of contact 330 for the guide follower 326. Once the offset between the cam surface 302 and the guide surface 304 has been established the cam track 300 may be manufactured within the determined dimensions to provide the respective cam surface 302 and guide surface 304 for use in the header 100. Referring back to FIG. 3, in the embodiment shown the cam track 300 is implemented using two end-to-end track sections that are joined end to end at respective joints 332 and 334. The jointed cam track 300 reduces material and machining requirements that would be necessary if a continuous cam track were to be fabricated. Each track section of the cam track 300 thus has opposing surfaces that provide portions of the cam surface 302 and the guide surface 304. In other embodiments the cam track may be implemented as a single continuous track or in more than two track sections.

The offset between the cam surface 302 and the guide surface 304 along the cam track thus varies around the cam track 300 and as such the cam track does not have a common cross-sectional thickness. Straighter sections of the cam track 300 such as shown at 408 will be thinner while curved sections such as shown at 410 will be thicker. This variation causes the followers 318, 320, and 326 to remain in engagement with the respective cam and guide surfaces throughout the traversal of the cam track 300. In one embodiment, the offset between the cam surface 302 and guide surface 304 may be slightly reduced with respect to the separation S, thus causing the followers 318, 320, and 326 to be subjected to a small loading force when received on the cam track 300. The small loading force maintains the follower surfaces in close contact with the cam and guide surfaces during traversal and accounts for any manufacturing imperfections.

The point-by point offsetting of the cam surface 302 to precisely determine the guide surface location around the cam track 300 has the advantage of facilitating a low friction and low noise traversal of the cam track by the linkages 306-308. This reduces vibration and noise generated during operation and also prolongs the service life of the follower components and the cam track 300. Other cam follower arrangements where the cam followers run within a race may result in the followers alternating between contacting the opposing race surfaces thus causing cam roller reversing with additional wear and noise. Cam followers that run in a race may also suffer from potential binding of the cam followers while traversing the track, which substantially increases wear, resistance to rotation, and noise. The embodiments disclosed herein further alleviate any potential binding problems.

As disclosed above, the cam track 300 is immobilized within the header 100 and the linkages 306-316 rotate with the pickup reel 120 causing the linkages to traverse the cam track. Referring to FIG. 5A, in one embodiment the cam assembly 140 includes a mounting plate 500. The cam track 300 is fixed to the mounting plate 500 via a plurality of posts 502 that are centrally located on the cam track 300 and permit the followers 318, 320 and 326 to traverse the track without being impeded by mounting hardware. In this embodiment the mounting plate 500 is welded to the bushing 352 to permit free rotation of the mounting plate 500 and cam track 300 about the reel axis 134 for adjusting the cam timing as described in more detail below. An end plate 530 is also carried on the shaft 206 and is bolted to the central reel tube 200 (not shown in FIG. 5A) to support the pickup reel 120 for rotation.

Figure 5C:
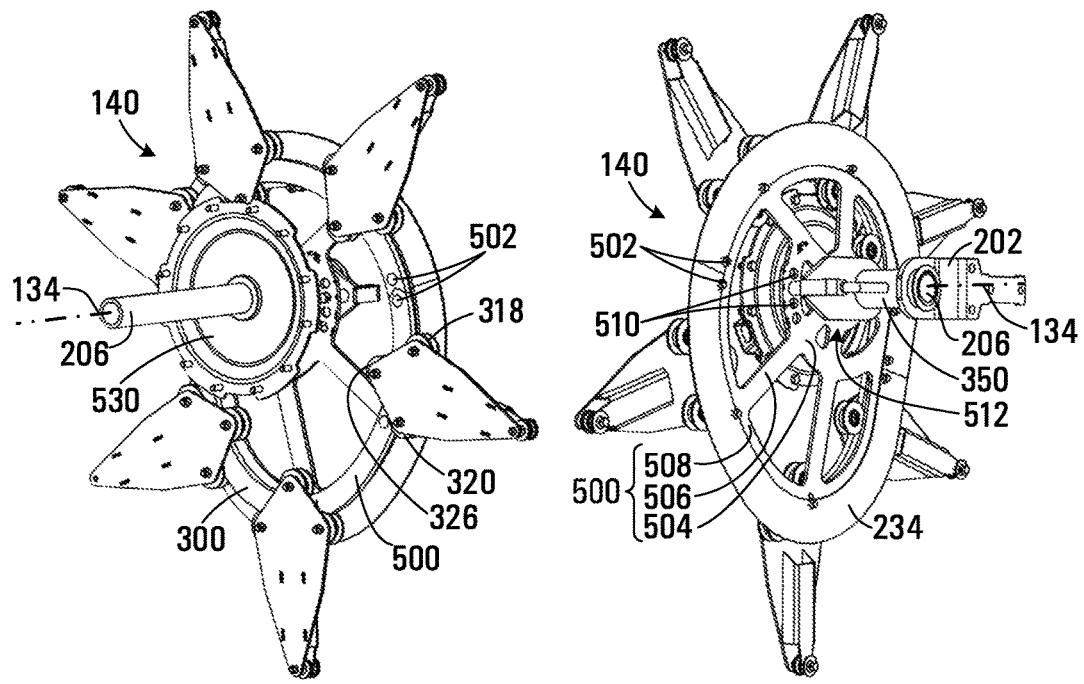
FIG. 5C is a perspective view of a cam locking mechanism associated with the cam assembly shown in FIG. 3.
Figure 5C:
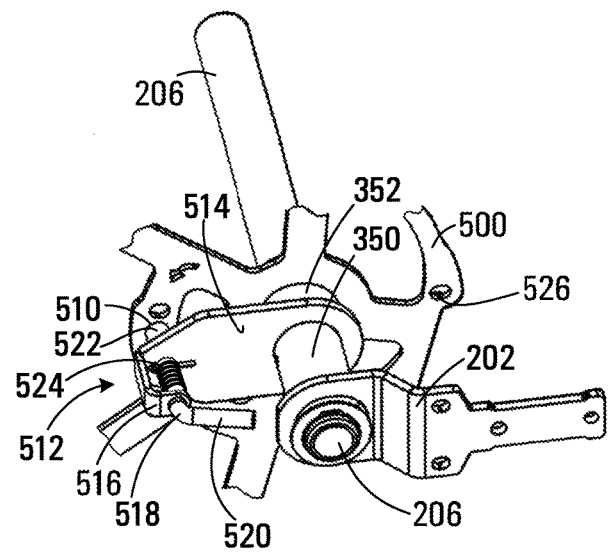

Referring to FIG. 5B, the mounting plate 500 includes a central portion 504, and a plurality of limbs 506 that support an outer ring 508 that is shaped to provide a mounting surface for mounting the plurality of posts 502. The deflector 234 covers and protects the underlying cam track 300 from crop interference. The shaft 206 is supported within the bushing 350 and bushing 352 (not shown in FIG. 5), which facilitates rotation of the shaft and the central reel tube 200 with respect to the cantilever mount 202. As disclosed above, the bar 204 of the cantilever mount 202 is bolted to the reel arm 124. The mounting plate 500 further includes a plurality of openings 510 that are each spaced apart on the central portion 504 at a common radial offset from the reel axis 134. The cam assembly 140 further includes a cam locking mechanism 512, shown an enlarged perspective vie in FIG. 5C.

Referring to FIG. 5C, in the embodiment shown the cantilever mount 202 is welded to the bushing 350, which supports the shaft 206 for rotation about the reel axis 134. The cam locking mechanism 512 also includes a locking plate 514 welded to the bushing 350, such that the locking plate is rigidly attached to the cantilever mount via the bushing 350. The locking plate 514 has a lug 516 and a support sleeve 522 that is welded to the locking plate and extends towards the mounting plate 500. The cam locking mechanism 512 also includes a locking pin 518 that extends through the lug 516, the locking plate 514, and the support sleeve 522 and has an end that is configured to engage a selected one of the plurality of openings 510 for immobilizing the mounting plate 500 with respect to the cantilever mount 202 and locking plate. The locking pin 518 includes a spring 524 between the lug 516 and locking plate 514 that provides a retaining force for causing the end of the locking pin to be urged into engagement with the selected one of the plurality of openings 510. The support sleeve 522 prevents the locking pin 518 from bending under load. The locking pin 518 also has a grip end 520, which a user is able to grasp to disengage the locking pin 518 from the selected opening 510 in the cam assembly 140. The cam assembly 140 can then be rotated to align another of the plurality of openings 510 with the end of the locking pin 518. The plurality of openings 510 are thus user selectable to facilitate advancing or retarding the cam track with respect to the pickup reel 120 to adjust a timing of the movement of the fingers 138 on the bats 208-216.

In this embodiment the mounting plate 500 further includes at least one additional opening 526 on an opposite side of the central portion 504 to the openings 508. By rotating the cam assembly 140 to align the end of the locking pin 518 for engagement in the additional opening 526 causes the plurality of fingers 138 on reel bats facing in the direction of movement 108 to lie at an obtuse angle of attack. When locked in the additional opening 526, the plurality of fingers 138 are retracted and disposed on the front or forward facing side of the pickup reel 120, thus reducing the transport width and also the possibility of damage to the fingers during transport of the header 100 when being transported or towed.

Figure 6:
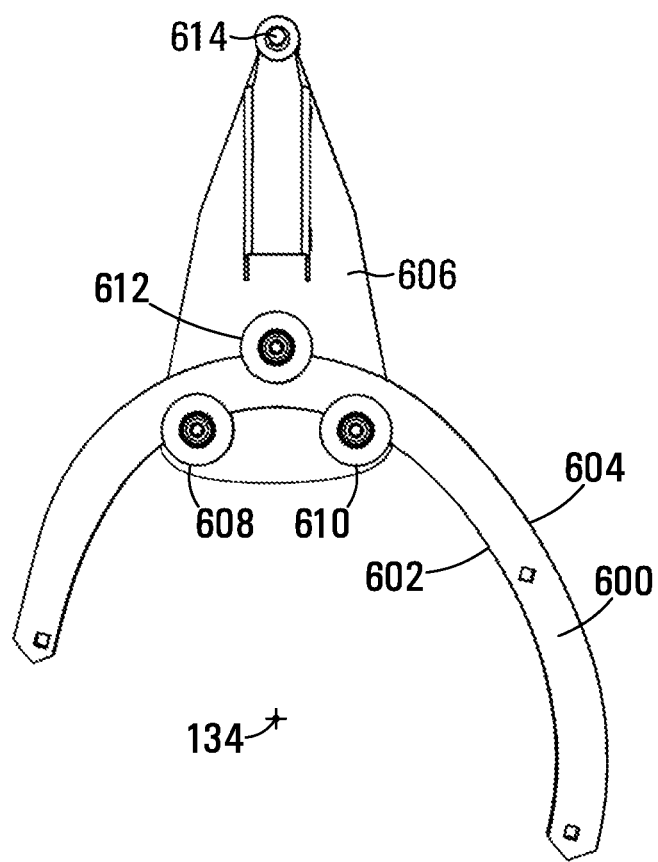
FIG. 6 is an elevation view of a cam track and linkage in accordance with another disclosed embodiment.

In the embodiments described above, the cam track 300 has an outwardly oriented surface with respect to the reel axis 134 (the surface 302) that acts as the cam surface and an inwardly oriented surface (the surface 304) that acts as the guide surface. Referring to FIG. 6, in another embodiment a cam track 600 may include an inwardly oriented surface 602 that acts as the cam surface, and an outwardly oriented surface 604 with respect to the reel axis 134 that acts as the guide surface. In this embodiment, a linkage 606 includes cam followers 608 and 610 that are spaced apart and engage the cam surface 602. The linkage 606 further includes a guide follower 612 that engages the outwardly oriented surface 604. Operation is generally as described above in that the profile of the cam surface 602 is selected to cause a pivot 614 to extend or retract with respect to the reel axis 134 in a generally radial direction. An offset between the guide surface 604 and the cam surface 602 is determined once a profile of the cam surface has been selected to provide desired attack angles $\alpha$ as a function of linkage traversal on the cam surface. In this embodiment, straighter sections of the cam track will be thicker while curved sections will be thinner.

In this embodiment the location of the cam followers 608 and 610 results in a pulling action on the linkage 606 and thus the fingers on the reel bat. The embodiment shown in FIGS. 3-5 results in the linkages 308-316 being pushed by the cam surface 302. The force for changing the angle of attack of the fingers is thus generally carried by the cam followers and cam surface while the guide follower provides a retaining force for maintaining contact throughout traversal of the cam track.

In the embodiments described above the cam tracks 300 and 600 provide both the cam surface and the guide surface on opposite sides of the track. In other embodiments the cam tracks 300 and 600 may be implemented as separate tracks including a first cam track that provides the cam surface and a second cam track that provides the guide surface, the first and second cam tracks being mechanically coupled to form the cam track.

The above embodiments provide a cam follower system in which the cam followers remain in full engagement throughout traversal of the cam track and the linkages are supported at two cam follower points on the cam surface. The linkages are thus fully supported to prevent lateral movement while moving along the track, thus preventing binding or excess noise and/or vibration that may result in premature wearing of components.

While specific embodiments have been described and illustrated, such embodiments should be considered illustrative only and not as limiting the disclosed embodiments as construed in accordance with the accompanying claims.

What is claimed is:

1. A crop harvesting header apparatus comprising:
    a pickup reel mounted for rotation about a reel axis within the header apparatus;
    a plurality of reel bats peripherally disposed on the pickup reel about a reel axis, each reel bat having a plurality of outwardly extending fingers along a length of the reel bat, each reel bat being rotatable about a bat axis;
    a non-circular cam track mounted adjacent to the pickup reel and surrounding the reel axis, the cam track being immobilized with respect to the header apparatus, the cam track including a cam surface and a guide surface;
    a linkage associated with each reel bat and having first and second spaced apart cam followers disposed to engage the cam surface at first and second points of contact, the cam surface being configured to cause displacement of the linkage in a generally radial direction with respect to the reel axis while traversing the cam track during rotation of the pickup reel, the linkage being coupled to the reel bat such that the displacement of the linkage causes rotation of the reel bat about the bat axis for changing an angle of attack of the fingers to control movement of a crop through the header apparatus;
a guide follower disposed on the linkage for engagement of the guide surface at a third point of contact between the first and second points of contact; and
wherein an offset between the guide surface and the cam surface along the cam track is selected to cause each of the first and second cam followers to maintain contact with the cam surface and the guide follower to maintain contact with the guide surface while traversing the cam track.

2. The apparatus of claim 1 wherein the offset between the guide surface and the cam surface varies for points of contact along the cam track, the offset being selected to cause a generally constant loading force on each of the first and second cam followers and the guide follower while traversing the cam track.

3. The apparatus of claim 1 wherein the cam track comprises:
an outwardly oriented surface with respect to the reel axis that acts as the cam surface; and
an inwardly oriented surface that acts as the guide surface.

4. The apparatus of claim 1 wherein the cam track comprises:
an inwardly oriented surface that acts as the cam surface; and
an outwardly oriented surface with respect to the reel axis that acts as the guide surface.

5. The apparatus of claim 1 wherein the cam track comprises a first cam track that provides the cam surface and a second cam track that provides the guide surface, the first and second cam tracks being mechanically coupled to form the cam track.

6. The apparatus of claim 1 wherein the cam track comprises:
a mounting plate; and
at least one track attached to the mounting plate via a plurality of posts extending parallel to the reel axis to facilitate unimpeded traversing of the cam track by the first and second cam followers and the guide follower.

7. The apparatus of claim 6 wherein the at least one track comprises a single track having opposing surfaces that provides both the cam surface and the guide surface.

8. The apparatus of claim 6 wherein the at least one track comprises at least two track sections mounted end to end on the mounting plate, each track section having opposing surfaces that provide portions of the cam surface and the guide surface.

9. The apparatus of claim 1 wherein the first and second cam followers each comprise a roller operably configured to engage the cam surface.

10. The apparatus of claim 1 wherein the guide follower comprises a roller operably configured to engage the guide surface.

11. The apparatus of claim 1 wherein the linkage comprises a plate and wherein:
the first and second cam followers are mounted spaced apart on the plate at a proximal end thereof;
the guide follower is mounted on the plate offset from the first and second cam followers; and
a distal end of the plate is coupled to the respective reel bat.

12. The apparatus of claim 1 wherein each reel bat comprises a crank arm mechanically coupled to the reel bat and wherein the linkage is coupled to an end of the crank arm for causing rotation of the respective reel bat about the bat axis in response to displacement of the linkage.

13. The apparatus of claim 1 wherein the cam track is rotatably mounted on a shaft aligned with the reel axis to facilitate advancing or retarding the cam with respect to the pickup reel to adjust a timing of the movement of the fingers on each reel bat.

14. The apparatus of claim 13 wherein the cam track comprises a mounting plate having a plurality of locking locations that selectively immobilize the cam track to provide a desired timing for movement of the fingers.

15. The apparatus of claim 13 wherein the mounting plate comprises at least one locking location disposed to immobilize the cam track at a location that causes the fingers on adjacent reel bats to be substantially retracted for transport of the header apparatus when not in operation.

16. A pickup reel apparatus comprising a first pickup reel and a second pickup reel mounted adjacently within the header apparatus, each pickup reel being configured as defined in claim 1.

* * * * *